(12) United States Patent
Miyamoto

(10) Patent No.: US 12,454,237 B2
(45) Date of Patent: Oct. 28, 2025

(54) VEHICLE SURROUNDING ENVIRONMENT MONITORING APPARATUS

(71) Applicant: SUBARU CORPORATION, Tokyo (JP)

(72) Inventor: Shinichi Miyamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/597,713

(22) Filed: Mar. 6, 2024

(65) Prior Publication Data

US 2024/0308457 A1    Sep. 19, 2024

(30) Foreign Application Priority Data

Mar. 14, 2023   (JP) ................. 2023-039860

(51) Int. Cl.
| | | |
|---|---|---|
| *B60R 1/27* | (2022.01) | |
| *B60R 21/015* | (2006.01) | |
| *B60R 21/01* | (2006.01) | |

(52) U.S. Cl.
CPC .. *B60R 21/01538* (2014.10); *B60R 21/01552* (2014.10); *B60R 2021/01088* (2013.01)

(58) Field of Classification Search
CPC ............ B60R 21/01538; B60R 25/305; B60R 21/01552; B60R 1/27
USPC ........................................................ 348/148
See application file for complete search history.

(56) References Cited

U.S. PATENT DOCUMENTS

| | | | | |
|---|---|---|---|---|
| 2021/0039602 A1* | 2/2021 | Moeller | ................ | B60R 25/305 |
| 2023/0298386 A1* | 9/2023 | Shioda | ...................... | G06T 7/70 |
| | | | | 382/118 |
| 2024/0412564 A1* | 12/2024 | Yoshihara | ............ | G06V 40/172 |

FOREIGN PATENT DOCUMENTS

JP         2011-32782 A     2/2011

* cited by examiner

*Primary Examiner* — Jeffery A Williams
(74) *Attorney, Agent, or Firm* — Rimon P.C.

(57) ABSTRACT

A vehicle surrounding environment monitoring apparatus includes an imaging device, a memory, a notifier, and a vehicle control processor. The imaging device acquires surrounding person facial information on the surrounding person. The memory stores occupant facial information on an occupant of the vehicle. The notifier issues a notification to one or both of the surrounding person and the occupant. The vehicle control processor performs a determination as to whether the surrounding person is the occupant by comparing the surrounding person facial information with the occupant facial information. The vehicle control processor causes the notifier to issue the notification to one or both of the surrounding person and the occupant when determining that the surrounding person is not the occupant. The vehicle control processor refrains from causing the notifier to issue the notification to the surrounding person when determining that the surrounding person is the occupant.

6 Claims, 4 Drawing Sheets

VEHICLE SURROUNDING ENVIRONMENT MONITORING APPARATUS

CROSS-REFERENCE TO RELATED APPLICATIONS

The present application claims priority from Japanese Patent Application No. 2023-039860 filed on Mar. 14, 2023, the entire contents of which are hereby incorporated by reference.

BACKGROUND

The disclosure relates to a vehicle surrounding environment monitoring apparatus.

A keyless entry device for a vehicle is disclosed in Japanese Unexamined Patent Application Publication (JP-A) No. 2011-32782, for example. The keyless entry device includes, for example, a wireless communication authentication unit, a face collation determination unit, and a human-body communication authentication unit. The wireless communication authentication unit establishes wireless communication with a portable unit held by a user to determine whether a unique number of the portable unit is a valid unique number which is registered. The face collation determination unit determines whether a detected face image acquired by an imaging unit matches with a reference face image which is registered. The human-body communication authentication unit determines, via human-body communication, whether the unique number of the portable unit held by the user who touches a doorknob matches with the valid unique number which is registered.

That is, the keyless entry device described in JP-A No. 2011-32782 performs the three determinations described above and unlocks a door of the vehicle when the results of all the determinations are positive. This makes it possible to improve security without impairing user's conveniences.

SUMMARY

An aspect of the disclosure provides a vehicle surrounding environment monitoring apparatus configured to monitor a surrounding person present around a vehicle. The vehicle surrounding environment monitoring apparatus includes an imaging device, a memory, a notifier, and a vehicle control processor. The imaging device is configured to acquire surrounding person facial information on the surrounding person. The memory is configured to store occupant facial information on an occupant of the vehicle. The notifier is configured to issue a notification to one or both of the surrounding person and the occupant. The vehicle control processor is configured to perform a determination as to whether the surrounding person is the occupant by comparing the surrounding person facial information with the occupant facial information. The vehicle control processor is configured to cause the notifier to issue the notification to one or both of the surrounding person and the occupant when determining that the surrounding person is not the occupant. The vehicle control processor is configured to refrain from causing the notifier to issue the notification to the surrounding person when determining that the surrounding person is the occupant.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
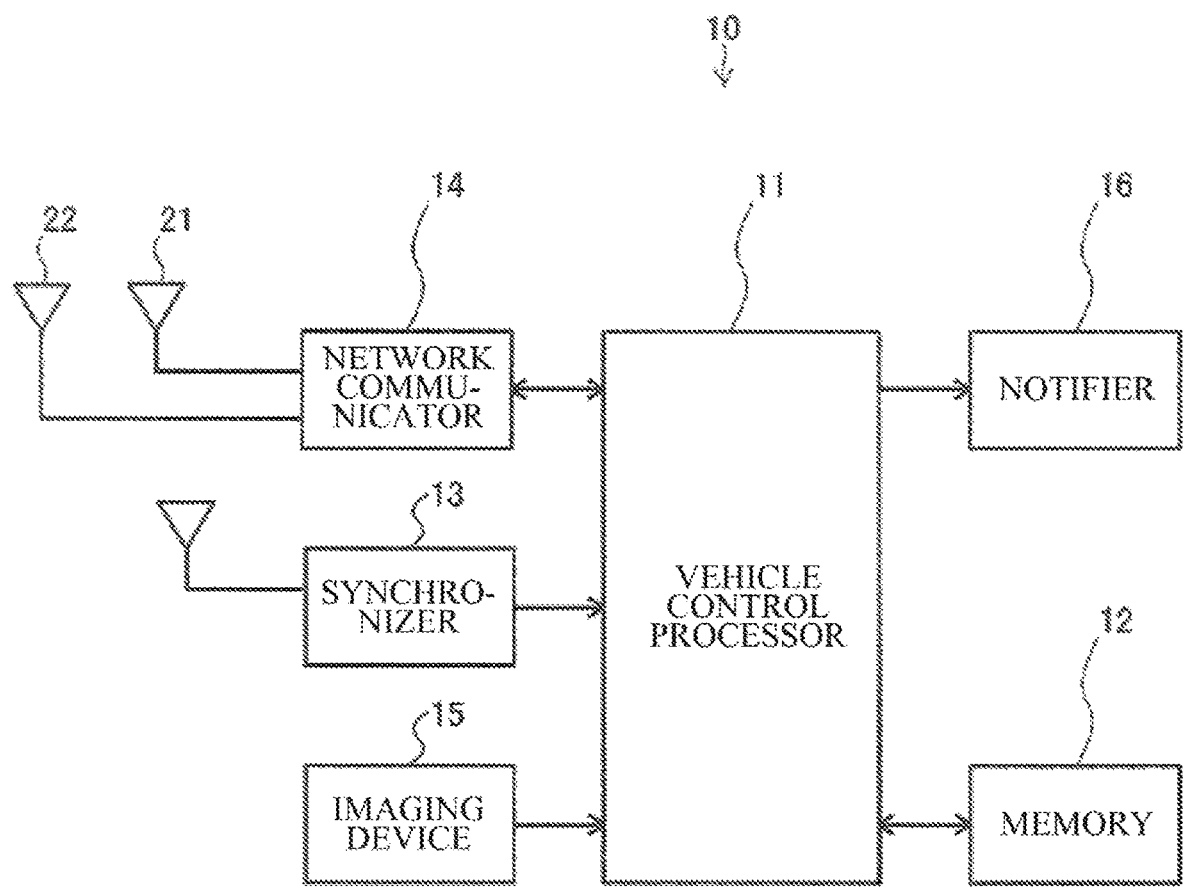
FIG. 1 is a block diagram of an exemplary configuration of a vehicle surrounding environment monitoring apparatus according to one example embodiment of the disclosure.

A keyless entry device disclosed in JP-A No. 2011-32782 includes no notifier. It is therefore difficult for the keyless entry device to give a warning directly to a suspicious person in order to reduce the risk of a vehicle being stolen. It is also difficult for the keyless entry device to urge the occupant of the vehicle to monitor the suspicious person by notifying the occupant of the information on the suspicious person in real time in order to reduce the risk of the vehicle being stolen.

It is desirable to provide a vehicle surrounding environment monitoring apparatus that makes it possible to reduce inconveniences caused by an erroneous determination and a possibility of the vehicle of being stolen by issuing a notification to a different person depending on a result of a determination as to whether a surrounding person present around the vehicle is an occupant of the vehicle.

Now, a vehicle surrounding environment monitoring apparatus 10 according to an example embodiment of the disclosure is described in detail with reference to the attached drawings. In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 2A:
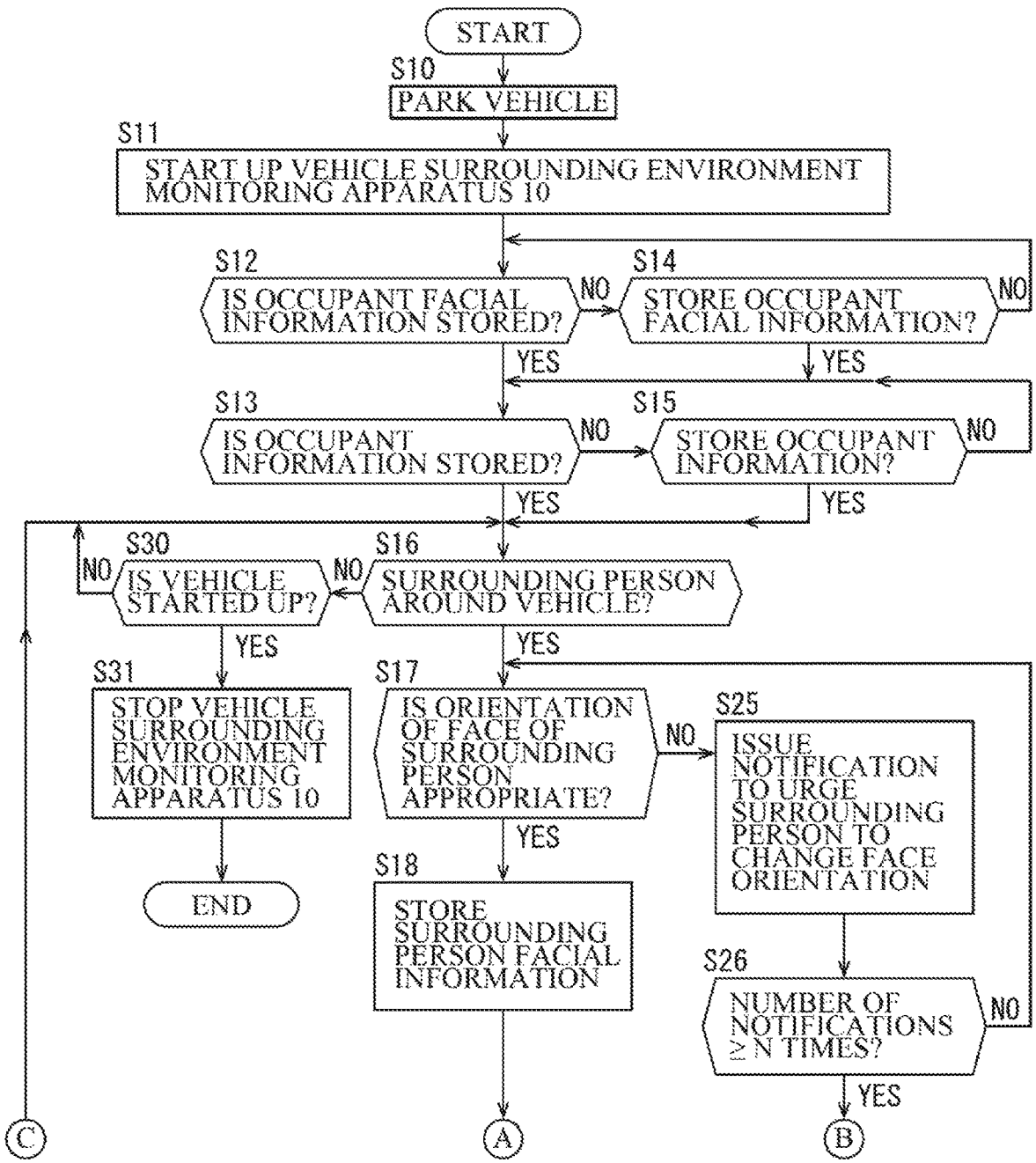
FIG. 2A is a flowchart describing a method of controlling the vehicle surrounding environment monitoring apparatus according to one example embodiment of the disclosure.
Figure 2B:
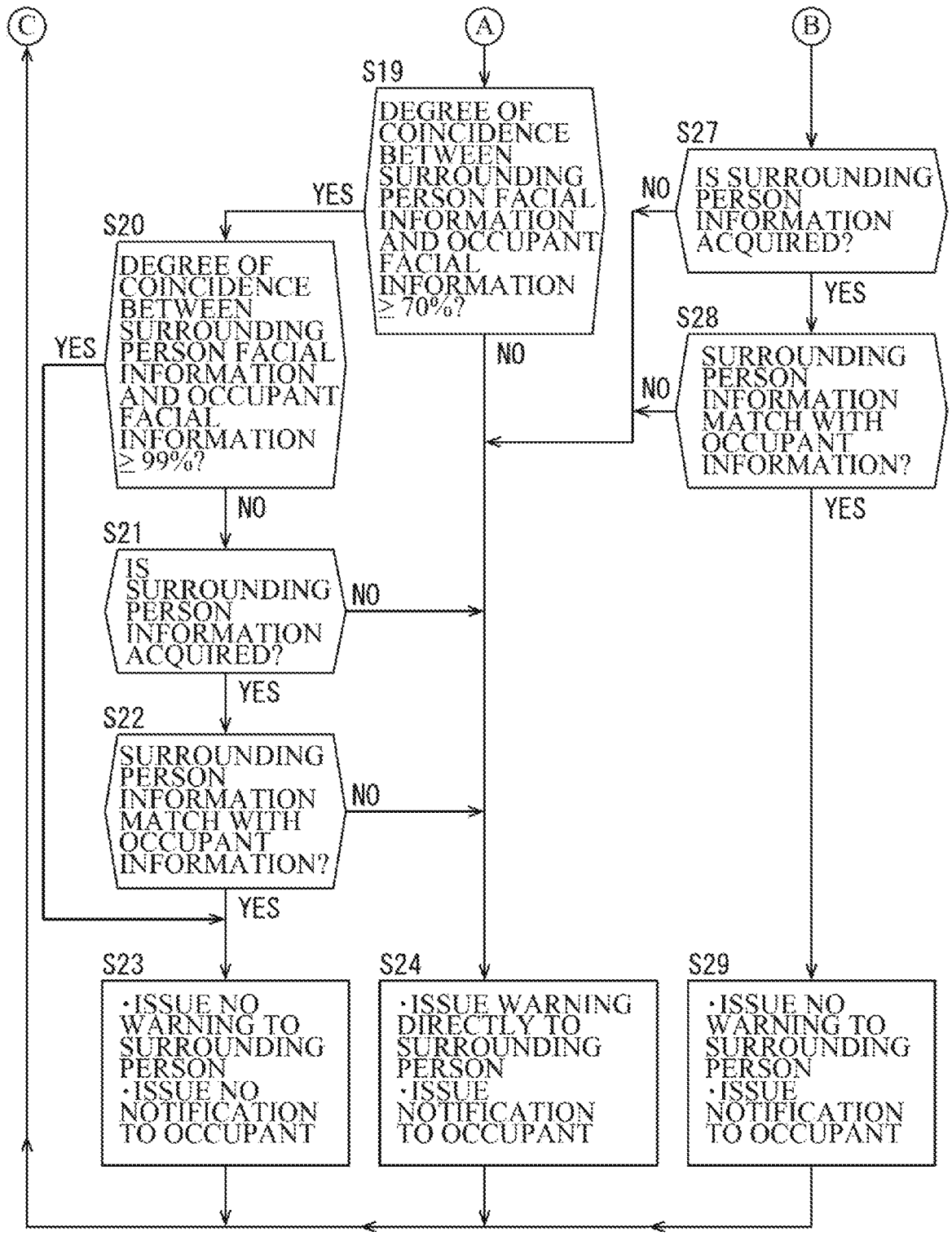
FIG. 2B is a flowchart following the flowchart illustrated in FIG. 2A that describes the method of controlling the vehicle surrounding environment monitoring apparatus according to one example embodiment of the disclosure.
Figure 3:
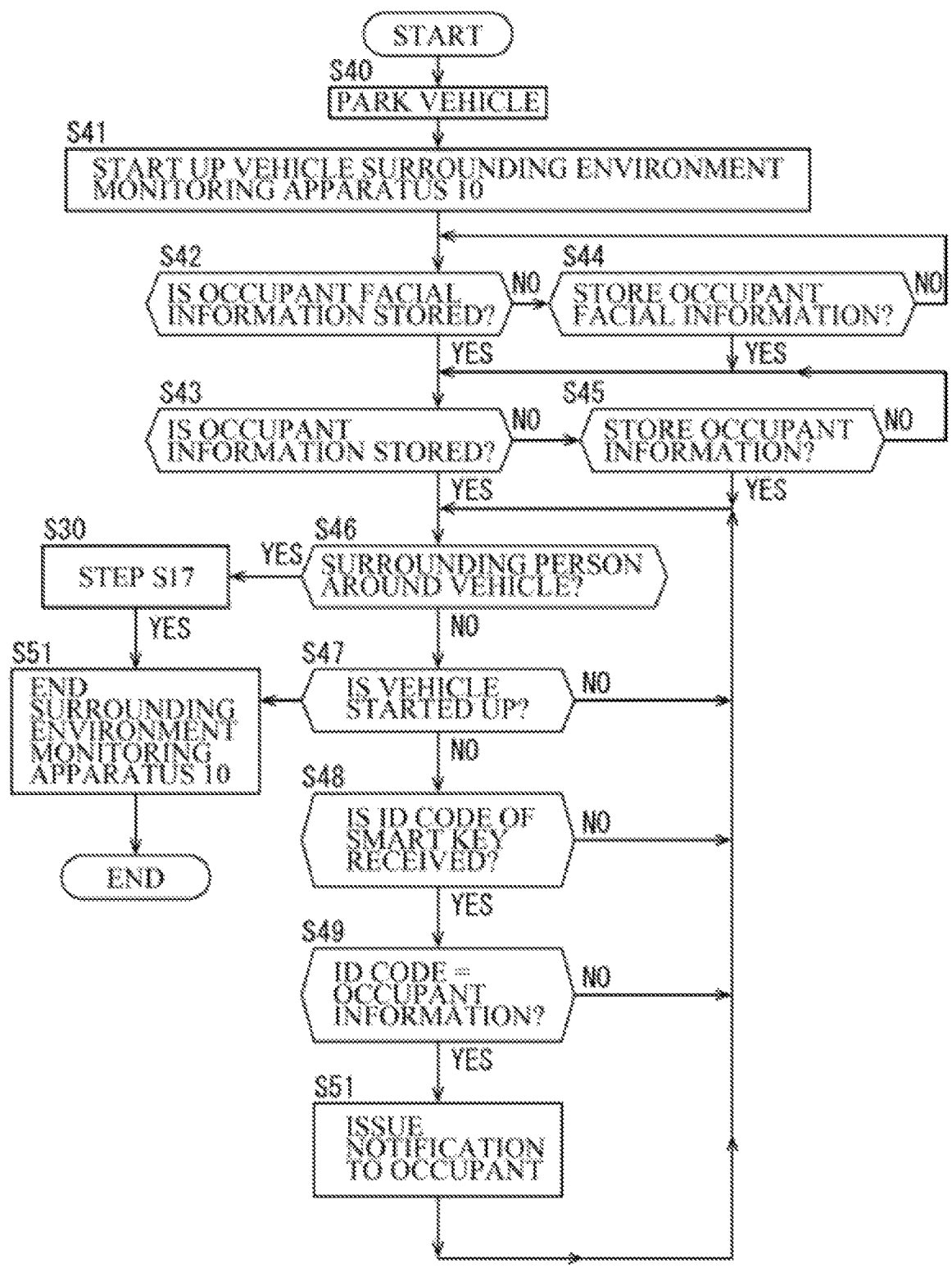
FIG. 3 is a flowchart describing a modification example of the method of controlling the vehicle surrounding environment monitoring apparatus.

FIG. 1 is a block diagram of an exemplary configuration of the vehicle surrounding environment monitoring apparatus 10 according to the example embodiment. FIGS. 2A and 2B illustrate a flowchart of a method of monitoring a surrounding environment of a vehicle with the vehicle surrounding environment monitoring apparatus 10 according to the example embodiment. FIG. 3 is a flowchart of a method of monitoring the surrounding environment of the vehicle with the vehicle surrounding environment monitoring apparatus 10 according to the example embodiment. The method illustrated in FIG. 3 is a modification example of the method illustrated in FIGS. 2A and 2B.

The vehicle surrounding environment monitoring apparatus 10 may include, for example, a vehicle control processor 11, a memory 12 that stores various kinds of data, a synchronizer 13 that communicates with a communication device of an occupant of the vehicle or a surrounding person present around the vehicle, a network communicator 14, an imaging device 15 that captures an image of the surrounding environment of the vehicle which includes the surrounding person, and a notifier 16.

The vehicle control processor 11 may include, for example, a central processing unit (CPU), a read only memory (ROM), and a random-access memory (RAM). The vehicle control processor 11 may be an electronic control unit (ECU) that includes one or more processors that execute various arithmetic operations to control the vehicle surrounding environment monitoring apparatus 10 and a non-illustrated driving device, such as an engine, of the vehicle.

The memory 12 may be, for example, a non-volatile memory such as an electrically erasable programmable read-only memory (EEPROM). The memory 12 may store various kinds of data necessary to control the vehicle, and one or more programs to be executed by the one or more processor. The memory 12 may store occupant facial information to be described later, for example. The occupant facial information may be used by the vehicle control processor 11 to determine whether the surrounding person is the occupant.

The synchronizer 13 may communicate with the communication device held by the occupant of the vehicle or the surrounding person present around the vehicle to send the information stored in the communication device to the memory 12 of the vehicle and store the information in the memory 12. The communication between the synchronizer 13 and the communication device may be established by near field communication such as Bluetooth (registered trademark), for example.

In the example embodiment, the communication device may be a portable terminal device such as a smartphone. In this case, the synchronizer 13 may acquire information on the occupant (hereinafter referred to as occupant information) and information on the surrounding person (hereinafter referred to as surrounding person information) from the portable terminal device, and may store the information in the memory 12. For example, the occupant information and the surrounding person information may be information relating to an owner stored in the portable terminal device, such as the name, telephone number, e-mail address, postal address, and birthday of the owner.

Alternatively, the communication device may be a smart key serving as a part of a smart key system, for example. In this case, the synchronizer 13 may send a LF signal to request the smart key to transmit an ID code. When receiving a RF signal including the ID code from the smart key, the synchronizer 13 may store the ID code in the memory 12. Note that an ID code of the vehicle may be stored in advance as the occupant information in the memory 12.

The network communicator 14 may perform a process for data communication via a known telematics communication system including a main antenna 21 and a sub-antenna 22 that are mounted on the vehicle. The telematics communication system may be a system that provides communication service such as emergency communication to an individual vehicle via communication between the individual vehicle and a non-illustrated service provider.

According to the example embodiment, when determining that the surrounding person present around the vehicle is not the occupant, the vehicle control processor 11 gives a notification about the presence of the suspicious person present around the vehicle to the owner of the vehicle or the communication device of the occupant that is registered in advance as an emergency notification destination.

The imaging device 15 may capture an image of the surrounding environment of the vehicle including the surrounding person, and may store the data on the captured image in the memory 12 of the vehicle. The imaging device 15 may be a camera module that includes an image sensor such as a CCD or a CMOS, and may capture an image of an environment outside a vehicle compartment of the vehicle. For example, the imaging device 15 may be a camera module or a dashboard camera in a driver assistance system. The imaging device 15 may be coupled to the vehicle control processor 11 via an in-vehicle network. The driver assistance system may be a system that assists traveling operations of a driver who drives the vehicle while the vehicle is being driven in a manual driving mode, and assists traveling operations while the vehicle is being driven in an automated driving mode.

When the vehicle control processor 11 determines that the surrounding person present around the vehicle is not the occupant, the notifier 16 may issue a notification by means of a sound or light to give a warning to the surrounding person. The notifier 16 may be, for example, a horn, a headlamp, or a hazard lamp of the vehicle. Alternatively, the notifier 16 may be a speaker disposed in the vehicle compartment of the vehicle or a speaker that outputs a notification to the outside of the vehicle.

Next, an exemplary procedure for conducting the method of monitoring the surrounding environment of the vehicle using the vehicle surrounding environment monitoring apparatus 10 is described with reference to FIGS. 2A and 2B.

As illustrated in FIG. 2A, the driver who is the occupant of the vehicle may stop driving the vehicle and park the vehicle in a parking lot by shifting a shift lever of the vehicle to a parking range in Step S10. When the shift lever is shifted to the parking range, the vehicle control processor 11 may detect a parked state of the vehicle and start up the vehicle surrounding environment monitoring apparatus 10 in Step S11.

In Step S12, the vehicle control processor 11 may control the memory 12 to determine whether the occupant facial information is stored in the memory 12. When the vehicle control processor 11 determines that the occupant facial information on one or more occupants are stored in the memory 12 (Step S12: YES), the procedure may proceed to Step S13. In the example embodiment, the occupant facial information may be image information on the face of an occupant having a possibility of boarding the vehicle. As to be described later, the vehicle control processor 11 may compare the occupant facial information with surrounding person facial information to determine whether the occupant facial information matches with the surrounding person facial information.

In contrast, when the vehicle control processor 11 determines that the occupant facial information is not stored in the memory 12 (Step S12: NO), the procedure may proceed to Step S14. In Step S14, the vehicle control processor 11 may cause the notifier 16 to urge the occupant to store the occupant facial information, for example. When the occupant stores the occupant facial information (Step S14: YES), the procedure may proceed to Step S13. In contrast, when the occupant does not store the occupant facial information (Step S14: NO), the vehicle control processor 11 may repeat issuing the notification to urge the occupant to store the occupant facial information for a predetermined time. When the occupant facial information is not stored within the predetermined time, the vehicle control processor 11 may stop the vehicle surrounding environment monitoring apparatus 10 from operating.

In Step S13, the vehicle control processor 11 may control the memory 12 to determine whether the occupant information is stored in the memory 12. When the vehicle control processor 11 determines that the occupant information on one or more occupants are stored in the memory 12 (Step S13: YES), the procedure may proceed to Step S16. Note that, in the example embodiment, the occupant information may be information on an occupant having the possibility of boarding the vehicle. As to be described later, the vehicle control processor 11 may compare the occupant information with the surrounding person information to determine whether the occupant information matches with the surrounding person information.

When the vehicle control processor 11 determines that the occupant information is not stored in the memory 12 (Step S13: NO), the procedure may proceed to Step S15. Thereafter, in Step S15, the vehicle control processor 11 may cause the notifier 16 to urge the occupant to store the occupant information, for example. When the occupant stores the occupant information (Step S15: YES), the procedure may proceed to Step S16. In contrast, when the occupant does not store the occupant information (Step S15: NO), the vehicle control processor 11 may repeat issuing the notification to urge the occupant to store the occupant information for a predetermined time. When the occupant information is not stored within the predetermined time, the vehicle control processor 11 may stop the vehicle surrounding environment monitoring apparatus 10 from operating.

In Step S16, the vehicle control processor 11 may control the imaging device 15 to start detecting the surrounding person from the image data on the surrounding environment of the vehicle. For example, the vehicle control processor 11 may extract the surrounding person facial information on the face of the surrounding person from the image data received from the imaging device 15 by a known face detection method using multiple trained samples of facial images, for example.

When the vehicle control processor 11 extracts the surrounding person facial information on the face of the surrounding person present around the vehicle from the image data received from the imaging device 15 (Step S16: YES), the procedure may proceed to Step S17. In contrast, when the vehicle control processor 11 does not extract the surrounding person facial information on the face of the surrounding person present around the vehicle from the image data received from the imaging device 15 (Step S16: NO), the vehicle control processor 11 may repeat extracting the surrounding person facial information on the face of the surrounding person present around the vehicle from the image data received from the imaging device 15.

In Step S17, the vehicle control processor 11 may analyze data on the orientation of the face, the profile of the face, the eyes, the nose, and the mouth of the surrounding person included in the extracted surrounding person facial information to determine whether the surrounding person facial information is appropriate to face matching determination. When the vehicle control processor 11 determines that the surrounding person facial information is appropriate to the face matching determination (Step S17: YES), the procedure may proceed to Step S18 in which the surrounding person facial information is stored in the memory 12.

In Step S19, the vehicle control processor 11 may control the memory 12 to compare the surrounding person facial information stored in Step S18 with the occupant facial information stored in the memory 12 to determine whether the surrounding person facial information matches with the occupant facial information. When the vehicle control processor 11 determines that the degree of coincidence between the occupant facial information and the surrounding person facial information is 70% or greater (Step S19: YES), the procedure may proceed to Step S20.

In Step S20, the vehicle control processor 11 may continue to execute the face matching determination between the occupant facial information identified in Step S19 and the surrounding person facial information. When the vehicle control processor 11 determines that the degree of coincidence between the surrounding person facial information and the occupant facial information identified as described above is 99% or greater (Step S20: YES), the procedure may proceed to Step S23.

In Step S23, the vehicle control processor 11 may determine that the surrounding person corresponding to the surrounding person facial information is the occupant of the vehicle. In that case, the vehicle control processor 11 may refrain from causing the notifier 16 to issue a warning to the surrounding person by means of a horn sound, for example. In addition, the vehicle control processor 11 may refrain from causing the network communicator 14 to issue a notification to the registered communication device of the occupant who is the owner of the vehicle, for example. Thereafter, the procedure may return to Step S16 to continue to monitor the surrounding environment of the vehicle.

In contrast, when the vehicle control processor 11 determines that the degree of coincidence between the surrounding person facial information and the occupant facial information is not 99% or greater (Step S20: NO), the procedure may proceed to Step S21. In Step S21, the vehicle control processor 11 may cause the synchronizer 13 to start communicating with the communication device held by the surrounding person to acquire the surrounding person information. Thereafter, when the surrounding person information is acquired by the synchronizer 13 (Step S21: YES), the acquired surrounding person information may be stored in the memory 12, following which the procedure may proceed to Step S22.

In Step S22, the vehicle control processor 11 may control the memory 12 to compare the surrounding person information with the occupant information stored in the memory 12, to thereby determine whether the surrounding person information matches with the occupant information. When the vehicle control processor 11 determines that the surrounding person information matches with one or more pieces of the occupant information (Step S22: YES), the procedure may proceed to Step S23. The control after Step S23 may be as described above.

In contrast, when the vehicle control processor 11 determines that the degree of coincidence between the occupant facial information and the surrounding person facial information is not 70% or greater (Step S19: NO), when the surrounding person information is not acquired by the synchronizer 13 from the communication device held by the surrounding person (Step S21: NO), or when the surrounding person information matches with neither piece of the occupant information (Step S22: NO), the procedure may proceed to Step S24.

In Step S24, the vehicle control processor 11 may determine that the surrounding person corresponding to the surrounding person facial information is not the occupant of the vehicle. In that case, the vehicle control processor 11 may cause the notifier 16 to issue a warning to the surrounding person by means of a horn sound, for example. In addition, the vehicle control processor 11 may cause the network communicator 14 to issue a notification to the registered communication device of the occupant who is the owner of the vehicle, for example. That is, the vehicle control processor 11 may determine that the surrounding person has a possibility of being a suspicious person who tries to steal the vehicle, and may issue a warning directly to the surrounding person and notify the occupant remote from the vehicle of the presence of the suspicious person around the vehicle. This reduces the possibility of the vehicle of being stolen. Thereafter, the procedure may return to Step S16 to continue to monitor the surrounding environment of the vehicle.

When the vehicle control processor 11 determines that the surrounding person facial information is not appropriate to the face matching determination (Step S17: NO), the procedure may proceed to Step S25. In Step S25, the vehicle control processor 11 may cause the notifier 16 to issue a notification to urge the surrounding person to change the orientation of the face directly to the imaging device 15. In Step S26, the vehicle control processor 11 may cause the notifier 16 to repeat issuing the notification to the surrounding person. When the surrounding person facial information appropriate to the face matching determination is received by the vehicle control processor 11 (Step S17: YES) before the number of notifications to the surrounding person reaches N-times (Step S26: NO), the procedure may proceed to Step S18. The control after the Step S18 may be as described above.

In contrast, when the surrounding person facial information appropriate to the face matching determination is not received by the vehicle control processor 11 (Step S17: NO) even after the number of the notifications to the surrounding person reaches N times (Step S26: YES), the procedure may proceed to Step S27.

In Step S27, the vehicle control processor 11 may cause the synchronizer 13 to start communicating with the communication device held by the surrounding person to acquire the surrounding person information. When the surrounding person information is acquired by the synchronizer 13 from the communication device held by the surrounding person (Step S27: YES), the acquired surrounding person information may be stored in the memory 12, following which the procedure may proceed to Step S28.

In Step S28, the vehicle control processor 11 may control the memory 12 to compare the surrounding person information with the occupant information stored in the memory 12 to determine whether the surrounding person information matches with the occupant information. When the vehicle control processor 11 determines that the surrounding person information matches with one or more pieces of the occupant information (Step S28: YES), the procedure may proceed to Step S29.

In Step S29, the vehicle control processor 11 may determine that the surrounding person corresponding to the surrounding person facial information is highly likely to be the occupant of the vehicle. In that case, the vehicle control processor 11 may refrain from causing the notifier 16 to issue a warning to the surrounding person by means of a horn sound, for example. Instead, the vehicle control processor 11 may cause the network communicator 14 to issue a notification to the registered communication device of the occupant who is the owner of the vehicle, for example. That is, since the surrounding person is likely to be the occupant of the vehicle although the determination based on the surrounding person facial information has not been performed yet, the vehicle control processor 11 may notify the occupant remote from the vehicle of the presence of the surrounding person around the vehicle just in case to reduce the possibility of the vehicle of being stolen. Thereafter, the procedure may return to Step S16 to continue to monitor the surrounding environment of the vehicle.

In contrast, when the surrounding person information is not acquired by the synchronizer 13 (Step S27: NO) or when the vehicle control processor 11 determines that the surrounding person information matches with neither piece of the occupant information (Step S28: NO), the procedure may proceed to Step S24. The control after Step S24 may be as described above. In that case, no surrounding person information is acquired, or the surrounding person is likely to be the suspicious person because the surrounding person information does not match with the occupant information. Accordingly, the warning may be issued to the surrounding person and the notification may be issued to the occupant of the vehicle to reduce the possibility of the vehicle of being stolen. Thereafter, the procedure may return to Step S16 to continue to monitor the surrounding environment of the vehicle.

The surrounding environment of the vehicle may be continued to be monitored while the vehicle is being parked. However, in a case where the surrounding person facial information on the surrounding person present around the vehicle is not extracted by the vehicle control processor 11 from the image data received from the imaging device 15 (Step S16: NO) and where the vehicle is started up by shifting the shift lever to the driving range (Step S30: YES), the vehicle control processor 11 may detect a traveling state of the vehicle and stop the vehicle surrounding environment monitoring apparatus 10 from operating.

According to the vehicle surrounding environment monitoring apparatus 10 of the example embodiment, the vehicle control processor 11 may first determine whether the surrounding person is the occupant of the vehicle based on the surrounding person facial information. The vehicle control processor 11 may perform the face matching determination in two stages including Steps S19 and Step S20. This reduces a load of an operation such as a synchronizing operation on the vehicle and reduces electric consumption at the vehicle.

When it is determined in the face matching determination based on the surrounding person facial information that the degree of coincidence between the surrounding person and the occupant of the vehicle is not 99% or greater, the face matching determination between the surrounding person and the occupant may be also performed based on the surrounding person information owned by the surrounding person. This control method makes it possible to reduce an erroneous determination by the vehicle control processor 11 or an erroneous warning from the vehicle control processor 11. It is therefore possible to reduce inconveniences for the occupant or the surrounding person.

Next, an exemplary method of monitoring the surrounding environment of the vehicle with the vehicle surrounding environment monitoring apparatus 10 is described with reference to HG 3. The method of monitoring the surrounding environment of the vehicle illustrated in FIG. 3 may be adapted to address a relay attack. Note that the method of monitoring the surrounding environment of the vehicle illustrated in HG 3 may be described by referring to the description with reference to FIGS. 2A and 2B described above, as appropriate.

As described in HG 3, the driver who is the occupant of the vehicle may stop driving the vehicle and park the vehicle in a parking lot by shifting the shift lever of the vehicle to the parking range in Step S40. When the shift lever is shifted to the parking range, the vehicle control processor 11 may detect the parked state of the vehicle and start up the vehicle surrounding environment monitoring apparatus 10 in Step S41.

In Step S42, the vehicle control processor 11 may control the memory 12 to determine whether the occupant facial information is stored in the memory 12. When the vehicle control processor 11 determines that the occupant facial information on one or more occupants are store in the memory 12 (Step S42: YES), the procedure may proceed to Step S43.

In contrast, when the vehicle control processor 11 determines that the occupant facial information is not stored in the memory 12 (Step S42: NO), the procedure may proceed to Step S44. In Step S44, the vehicle control processor 11 may cause the notifier 16 to urge the occupant to store the occupant facial information, for example. When the occupant stores the occupant facial information (Step S44: YES), the procedure may proceed to Step S43. In contrast, when the occupant does not store the occupant facial information (Step S44: NO), the vehicle control processor 11 may repeat issuing the notification to urge the occupant to store the occupant facial information for a predetermined time. When the occupant facial information is not stored within the predetermined time, the vehicle control processor 11 may stop the vehicle surrounding environment monitoring apparatus 10 from operating.

In Step S43, the vehicle control processor 11 may control the memory 12 to determine whether the occupant information is stored in the memory 12. When the vehicle control processor 11 determines that the occupant information on one or more occupants are stored in the memory 12 (Step S43: YES), the procedure may proceed to Step S46.

When the vehicle control processor 11 determines that the occupant information is not stored in the memory 12 (Step S43: NO), the procedure may proceed to Step S45. Thereafter, in Step S45, the vehicle control processor 11 may cause the notifier 16 to urge the occupant to store the occupant information, for example. When the occupant stores the occupant information (Step S45: YES), the procedure may proceed to Step S46. In contrast, when the occupant does not store the occupant information (Step S45: NO), the vehicle control processor 11 may repeat issuing the notification to urge the occupant to store the occupant information for a predetermined time. When the occupant information is not stored within the predetermined time, the vehicle control processor 11 may stop the vehicle surrounding environment monitoring apparatus 10 from operating.

In Step S46, the vehicle control processor 11 may control the imaging device 15 to start detecting the surrounding person from the image data on the surrounding environment of the vehicle.

When the vehicle control processor 11 does not extract the surrounding person facial information on the face of the surrounding person present around the vehicle from the image data received from the imaging device 15 (Step S46: NO), the procedure may proceed to Step S47. When the vehicle is still in the parked state (Step S47: NO), the procedure may proceed to Step S48.

When the vehicle control processor 11 receives a RF signal including an ID code from a smart key by controlling the synchronizer 13 (Step S48: YES), the ID code may be stored as the surrounding person information in the memory 12, following which the procedure may proceed to Step S49.

In Step S49, the vehicle control processor 11 may control the memory 12 to compare the surrounding person information with the occupant information stored in the memory 12 to determine whether the surrounding person information matches with the occupant information. When the vehicle control processor 11 determines that the ID code serving as the surrounding person information matches with the ID code stored as the occupant information (Step S49: YES), the procedure may proceed to Step S50.

In Step S50, the vehicle control processor 11 may determine that a possibility of the vehicle of being subjected to a relay attack is high because the RF signal including the ID code is received by the vehicle despite that there is no surrounding person around the vehicle. In that case, the vehicle control processor 11 may cause the network communicator 14 to issue a notification to the registered communication device of the occupant who is the owner of the vehicle, for example. Thereafter, the procedure may return to Step S46 to continue to monitor the surrounding environment of the vehicle.

In contrast, when the FR signal including the ID code is not received by the synchronizer 13 (Step S48: NO) or when the vehicle control processor 11 determines that the ID code serving as the surrounding person information does not match with the ID code which is one piece of the occupant information (Step S49: NO), the procedure may proceed to Step S46. Thereafter, the surrounding environment of the vehicle may be continued to be monitored as described above.

The surrounding environment of the vehicle may be continued to be monitored while the vehicle is being parked. However, when the vehicle is started up by shifting the shift lever to the driving range (Step S47: YES), the vehicle control processor 11 may detect a traveling state of the vehicle and stop the vehicle surrounding environment monitoring apparatus 10 from operating.

When the vehicle control processor 11 extracts the surrounding person facial information on the face of the surrounding person present around the vehicle from the image data received from the imaging device 15 (Step S46: YES), the procedure may proceed to Step S17 which is described above with reference to FIG. 2A. The control after Step S17 may be as described above.

As described above, the method, which is illustrated in FIG. 3, of monitoring the surrounding environment of the vehicle using the vehicle surrounding environment monitoring apparatus 10 may be adapted to address a relay attack, and may be executed when it is determined that the occupant facial information and the occupant information are stored in the memory 12 in Steps S42 and S43; however, this is a non-limiting example. For example, the monitoring method described above may be executed when one or both of the occupant facial information and the occupant information are stored in the memory 12. Alternatively, various modifications may be made without departing from the gist of the disclosure.

According to the vehicle surrounding environment monitoring apparatus of the example embodiments described above, the vehicle control processor may determine whether the surrounding person present around the vehicle is the occupant of the vehicle based on the surrounding person facial information and the surrounding person information on the surrounding person present around the vehicle. Depending on the result of the determination, the vehicle control processor issues a notification or a warning to a different person. This reduces inconvenience caused by an erroneous determination and reduces the possibility of the vehicle of being stolen.

The invention claimed is:

1. A vehicle surrounding environment monitoring apparatus configured to monitor a surrounding person present around a vehicle, the vehicle surrounding environment monitoring apparatus comprising:
   a camera configured to capture an image outside and surrounding of the vehicle;
   a memory configured to store occupant facial information on an occupant of the vehicle and occupant information linked to the occupant; and
   circuitry configured to:
      determine whether a surrounding person is present based on the image captured by the camera;
      in response to determining that the surrounding person is present, execute a facial information acquisition process to acquire surrounding person facial information from the image;
      in response to successful acquisition of the surrounding person facial information by execution of the facial information acquisition process, calculate a degree of coincidence between the surrounding person facial information and the occupant facial information;
      in response to the degree of coincidence is less than a first value, execute a first notification process and a second notification process, wherein the first notification process includes one or both of: (i) controlling a sound output device disposed in the vehicle to output sound, and (ii) controlling a light emitting device disposed in the vehicle to emit light, and wherein the second notification process includes controlling a first communication device disposed in the vehicle to transmit a notification to a predetermined portable terminal device;
      in response to the degree of coincidence is equal to or greater than a second value that is greater than the first value, not execute the first notification process and the second notification process;
      in response to the degree of coincidence is equal to or greater than the first value and less than the second value, execute a first information acquisition process, wherein the first information acquisition process includes acquiring first surrounding person information from a portable communication device via direct wireless communication through a second communication device disposed in the vehicle, the portable communication device being located outside the vehicle and within a direct wireless communication range of the second communication device;
      in response to successful acquisition of the first surrounding person information by execution of the first information acquisition process, determine whether the first surrounding person information matches the occupant information;
      in response to determining that the first surrounding person information matches the occupant information, not execute the first notification process and the second notification process; and
      (1) in response to failure to acquire the first surrounding person information by execution of the first information acquisition process, or (2) in response to determining that the first surrounding person information does not match the occupant information, execute the first notification process and the second notification process.

2. The vehicle surrounding environment monitoring apparatus according to claim 1, wherein the circuitry is further configured to:
   in response to failure to acquire the surrounding person facial information by execution of the facial information acquisition process, execute a second information acquisition process to acquire second surrounding person information from the portable communication device via the direct wireless communication through the second communication device;
   in response to successful acquisition of the second surrounding person information by execution of the second information acquisition process, determine whether the second surrounding person information matches the occupant information;
   in response to determining that the second surrounding person information matches the occupant information, not execute the first notification process and execute the second notification process; and
   (1) in response to failure to acquire the second surrounding person information by execution of the second information acquisition process, or (2) in response to determining that the second surrounding person information does not match the occupant information, execute the first notification process and the second notification process.

3. The vehicle surrounding environment monitoring apparatus according to claim 2, wherein the circuitry is further configured to execute a third notification process in the facial information acquisition process in response to failure to acquire the surrounding person facial information from the image, wherein the third notification process includes one or both of:
   (i) controlling the sound output device to output sound in a manner different from that in execution of the first notification process; and
   (ii) controlling the light emitting device to emit light in a manner different from that in execution of the first notification process.

4. The vehicle surrounding environment monitoring apparatus according to claim 1,
   wherein the memory is further configured to store a first ID code, and
   wherein the circuitry is further configured to:
      in response to determining that the surrounding person is not present based on the image captured by the camera, determine whether a second ID code received from the second communication device matches the first ID code; and
      execute the second notification process in response to determining that the second ID code matches the first ID code.

5. The vehicle surrounding environment monitoring apparatus according to claim 2,
   wherein the memory is further configured to store a first ID code, and
   wherein the circuitry is further configured to:
      in response to determining that the surrounding person is not present based on the image captured by the camera, determine whether a second ID code received from the second communication device matches the first ID code; and execute the second notification process in response to determining that the second ID code matches the first ID code.

6. The vehicle surrounding environment monitoring apparatus according to claim 3,
wherein the memory is further configured to store a first ID code, and
wherein the circuitry is further configured to:
in response to determining that the surrounding person is not present based on the image captured by the camera, determine whether a second ID code received from the second communication device matches the first ID code; and
execute the second notification process in response to determining that the second ID code matches the first ID code.

* * * * *